Nov. 14, 1933.   H. W. SPRAGUE   1,935,337
CUTTER HEAD
Filed Aug. 6, 1931   2 Sheets-Sheet 2
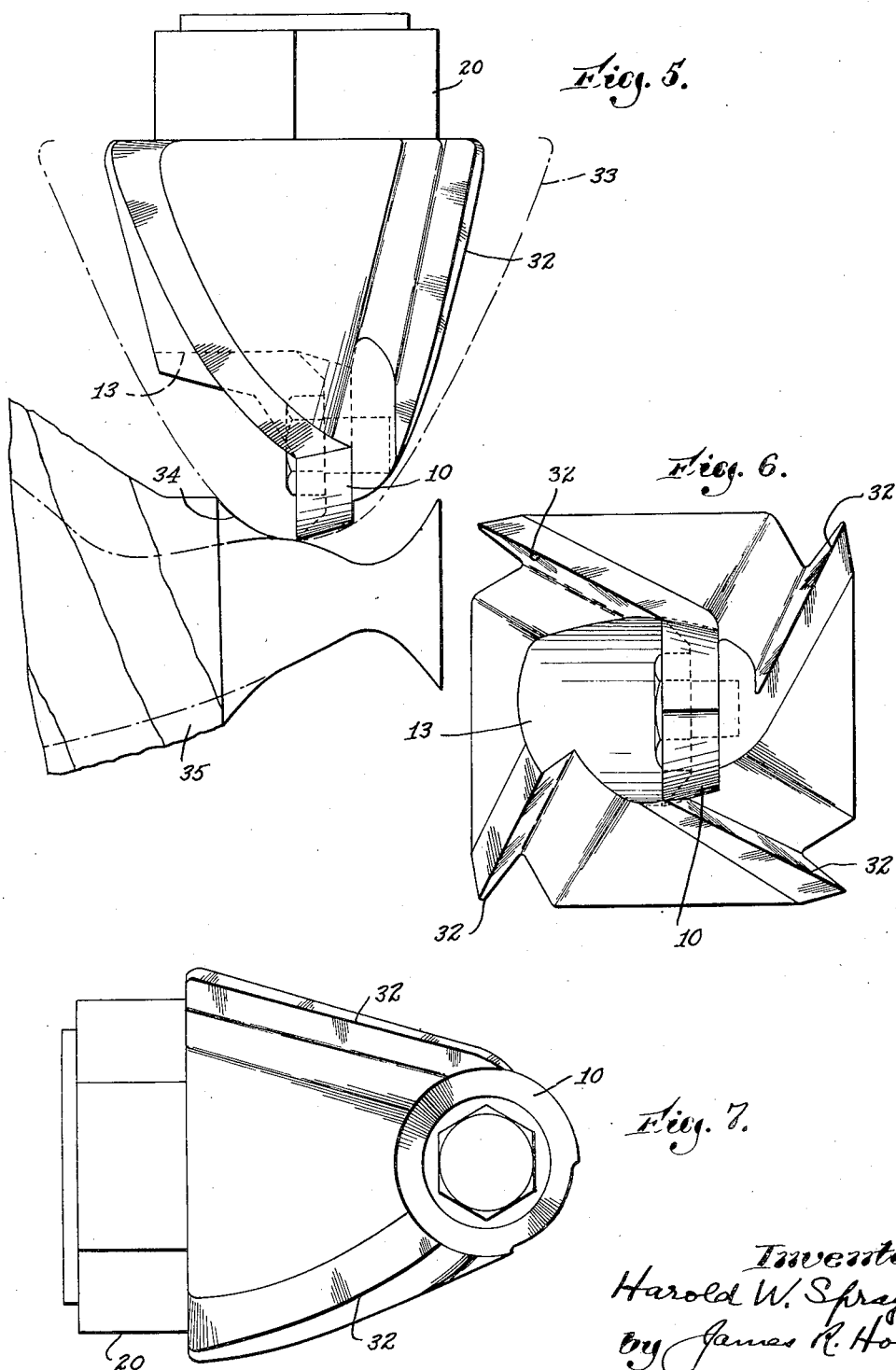
Inventor
Harold W. Sprague
by James R. Hodder
Attorney Patented Nov. 14, 1933

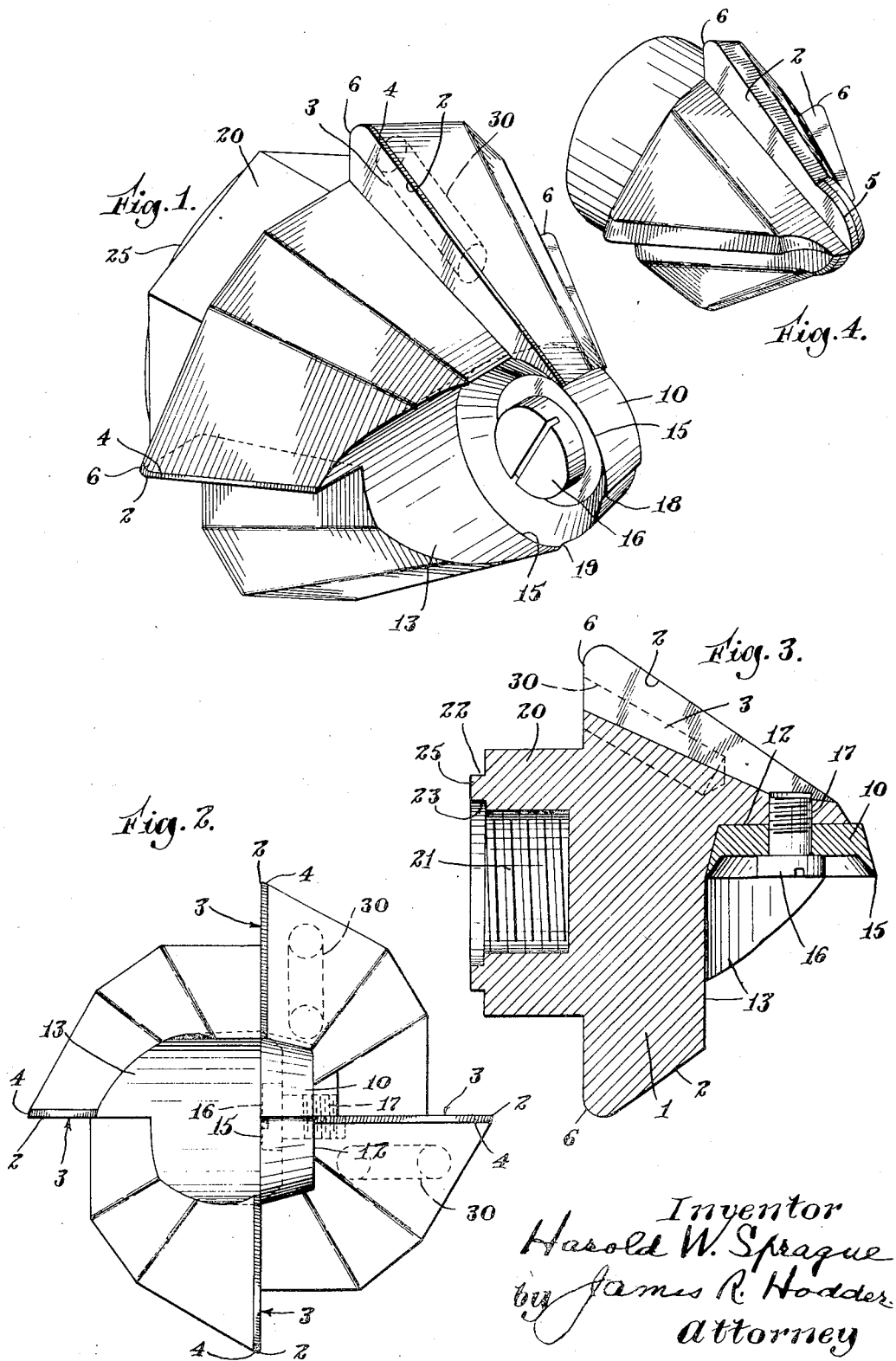

1,935,337

UNITED STATES PATENT OFFICE 1,935,337

CUTTER HEAD

Harold W. Sprague, Brockton, Mass.

Application August 6, 1931. Serial No. 555,445

1 Claim. (Cl. 144—219)

My present invention is a novel and improved form and construction of a cutter head, particularly intended for use in cutting lasts, golf club heads, and such articles of uneven contour, and particularly where the cutter follows a model.

Heretofore, in the construction of cutter heads at present in general use in turning lathes, such as last turning lathes, the cutters have been mounted on an axis either parallel to the line of feed and also parallel to the axis of rotation of the work, or at an angle oblique thereto. In such work the cutter operates on a relatively large block, cutting away the surplus portions as it is fed along, and in prior constructions where the cutter was on an axis parallel with the axis of rotation of the work, it was not feasible to form such cutters with a rim diameter of less than 8″ or 10″. As the diameter of the cutter head determined the limit in which the lathe would form a concave curve in the work, and as many lasts, and the like were made with some portions on a lesser radius than an 8″ cutter head could cut, such work had to be done by hand. Thereafter, it was found that by mounting the cutter head on an oblique axis, a slight gain could be effected in the making of such concave or hollow portions, as modern styles in shoe lasts require.

In my copending application, Ser. No. 562,529, filed September 12, 1931, I have illustrated, claimed and described a complete machine for turning lasts wherein a cutter head of the type herein illustrated and claimed is preferably used. Reference is, therefore, made to said copending application for further and fuller disclosure and illustration of the mounting, operating angular position, and function of the improved cutter head of my present application in a last turning machine.

By inclining the cutter heads relatively with the line of feed and the axis on which the work was turning, it has not been commercially practical to form hollow or concave portions smaller than with a diameter of 3½″, which heretofore has been the extreme limit possible. In carrying out such prior work, cutter heads of peculiar formation have been developed, such as conical, pear-shaped, etc., but all with a larger diameter toward the work.

A still further difficulty of such prior methods, and especially where an oblique axis of the cutter head was employed, was with the distance of the cutter head from the bearings, and the difficulties involved in cutting through such material as rock maple—which is universally used for shoe lasts—would produce a vibration or " chattering " of the cutter head during the cutting operation, especially where an extra mass of wood had to be cut away to follow the formation of the model. Further, such oblique mounting necessitated a considerable extension of the shaft carrying the cutter head beyond its bearing, and frequently resulted in " springing " of the shaft.

My present invention obviates the difficulties above briefly outlined, and I have devised a cutter head which is sturdy in construction, efficient in operation, suitable for speeds of 7000 R. P. M. and more, and which will be free of vibration, " springing ", or chattering, and which will follow a form and cut concave or hollow portions in the work on extremely small diameter, as small as 1″, being feasible and commercial. This capacity to follow a model with as intricate convolutions as concave portions formed on such a small diameter as 1″, is extremely important and gives the cutter head a scope and range of work heretofore considered impossible, and gives my cutter head a capacity beyond the requirements of the most intricate models in shoe lasts, golf club heads, and the like, and operated efficiently and smoothly on rock maple, persimmon wood, or the like hard woods.

A most important feature of the present invention is that I provide an extremely sturdy cutter head construction with the bearings for the rotating shaft or the spindle carrying the cutter head extremely close to the work and yet without interfering with the mass or portions in the block which are to be cut away to follow the model.

Furthermore, my present invention enables me to utilize the advantages in a cutter head, particularly for shoe last work and operating on hard woods, such as rock maple or the like, which combines the advantageous features of a roughening cutter and a finishing cutter portion in the same cutter head.

A still further novel and important feature consists in the construction and arrangement whereby I utilize the narrowest point of the cutter as in contact with the work, thereby distinguishing the present from prior methods, at least in turning lathes, and in the cutter head, particularly when mounted on an oblique axis and with the greatest diameter of the cutter toward the work, as was necessary in the case of conical or pear-shaped cutter heads.

In my invention I present the smallest diameter of the cutter head toward the work and thereby greatly facilitate the cutting action, particularly in concave portions formed on a small diameter such as 1″ or even less.

In carrying out my invention I have devised what I term as a mushroom cutter head, with the point of smallest diameter of the cutter head toward the work. Also I mount my improved mushroom cutter head on a shaft with the axis at right angles to the line of feed and at right angles to the action of rotation of the work on which the cutter head is to operate.

Also, I form my improved form of cutter head with the greatest diameter of the cutting portions to constitute a roughing cutter portion and with the cutting instrumentalities at the point or narrowest portion to constitute the finishing cutting portion.

A still further novelty in my present invention consists in the arrangement of the cutting devices, whereby the finishing cutter may be, and preferably is, formed separable from the body of the mushroom cutter, and said finishing portion, arranged with the cutting edge from the axis of rotation of the cutter head outwardly, can be quickly renewed by loosening the attaching devices and turning slightly to bring a fresh edge into operation.

I believe that my invention of a mushroom cutter head for the work described particularly where involved contours and reverse curves are to be cut and with the cutter head operating at right angles, is broadly new in this art and I, therefore, wish to claim the same herein broadly. My term of a "mushroom cutter head" I have coined for the purpose of more accurately defining my type of cutter head constituting both a roughing and finishing cutter in the same instrument and with means cutting from the apex rearwardly, as distinguished from a conical or the like cutter head operating with the cutting edges on the wings or sides of the cone.

Furthermore, so far as I am advised, the formation of my cutter head, which I have designated as a mushroom cutter, with the wing portions at the greatest diameter to constitute a roughing cutter, while the cutting instrumentalities at the smallest point or diameter constitute the finishing cutting portion, is a distinct novelty and I wish to claim the same herein broadly.

I have discovered that a mushroom cutter head made in accordance with my invention and mounted and turning on an axis substantially at right angles to the line of feed performs a much smoother cutting action on the work, thus, in a wooden shoe last, for example, much more completely cutting out the last and leaving a relatively slight amount of finishing work to be done, which is an important feature in my present invention. While my improved cutter head is particularly intended for use while feeding progressively in a wood turning lathe, wherein the work is also turning as in a last lathe, it is also suitable for use where the work may be stationary and the cutter alone is feeding. In either instance the benefit of the roughing and finishing cutting surfaces is obtained.

Referring to the drawings illustrating preferred embodiments,

Fig. 1 is a view in perspective of my preferred construction of cutter head;

Fig. 2 is a plan view;

Fig. 3 is a longitudinal cross-sectional view, and

Fig. 4 is a perspective view of a modified form of the cutter head.

Figs. 5, 6 and 7 illustrate my cutter head with spirally formed cutting edges, Fig. 5 being a side view, Fig. 6 a top plan view, and Fig. 7 a side view at right angles as shown in Fig. 5.

As shown in the drawings, my cutter head is of extremely sturdy, rigid, and wear-resisting form, constituting a body portion 1, which may be of high-speed steel, or the like, and preferably is formed with a plurality of cutting wings or edges, designated at 2, formed on suitable faces 3 and with bevelled or backing off portions 4, as clearly shown in the drawings. These cutting edges are at the extreme outer diameter of the mushroom cutter head and extend in a line substantially tangential with the endmost point or finishing cutting portion, and preferably extend over the end as shown at 6. If desired, I may form the cutting edges 2 with a spiral or oblique edge relatively with its axis.

The finishing cutter may be formed integrally with the cutter head at 5, as shown in Fig. 4, and/or preferably formed with a removable and renewable cutter 10. To carry the cutter 10, and as shown in Figs. 1, 2, and 3, I form a recess adjacent the head or point of the mushroom 1, as clearly illustrated in Fig. 3, at 12 and 13, cutting same to receive the circular finishing cutter 10. This cutter 10, as here shown in preferred form, is a ring cutter with the edge 15 formed as a flange, and is held in position by bolt or screw 16, through a recess in the center, and being tapped into a correspondingly threaded recess 17 in the end wall of the recess in the body 1. Preferably, the ring cutter 10 has the cutting flange 15 reduced as shown at 18 and 19 to give a proper clearance and permit this cutter to operate, the point 18 being positioned substantially in line with the axis of rotation of the cutter head 1. As shown in the drawings, the cutter here illustrated is shown for rotation from right to left, viewed in Fig. 1.

When the cutting edge portion of the ring cutter 10 is worn, a slight loosening of the bolt 16 and rotative action of the cutter 10 will bring a fresh portion of the cutting ring edge 15 into position and this finishing cutter can be quickly removed or replaced when desired. To attach the cutter head I form the body portion 1 with a depending, and preferably shouldered hub 20, having an internally threaded central portion 21 to fit into a correspondingly threaded end of the shaft carrying the same with the threads arranged for tightening during the rotation of the cutter. This hub portion is also provided with recesses 22 and 23 forming a projecting shoulder 25 to give a firm bearing basis if desired, and preferably also the hub 20 is formed horizontally, or the like, to receive a wrench for tightening and untightening.

With my novel mushroom cutter head mounted on an axis at right angles to the rotation of the work, and also at right angles, or substantially so, to the line of feed of the cutter, it will be appreciated that the tangential cutting wings or edges 2, as they are moved into and against the block from which the model is to be cut will produce a roughing or rough cutting action in advance of the finishing cutter 10, or of the finishing cutting edges 5 in the form shown in Fig. 4. Furthermore the finishing cutter 10 or the finishing cutting edges 5 may be formed on a diameter sufficiently small to cut in an extremely small radius, practically unlimited in extent, and commercially possible, down to concave portions of an inch in circumference, or even less, with perfect facility.

It may be desirable to balance the metal in the cutter head to counterbalance the cut-away portion at 12 and 13, which is in the form shown in Figs. 1, 2, and 3, and for this purpose I may bore one or more recesses in the diametrically opposite wing portions, as indicated in dotted lines at 30. Such balanced construction facilitates even running.

As shown in the modifications, Figs. 5, 6, and 7, I may form the blank cutter head with the head 20 and finishing cutter 10 as shown in Figs. 1 to 3 but with the side cutting edges 32, preferably four in number similar to the cutting edges 2 in the forms already described, with the slanting or spiral effect as the same extends from the apex toward the base of the cutter. This arrangement facilitates a more even operation of the cutter, effecting a cutting action as shown by the outline 33; prevents liability of the cutter head jumping or "chattering", as the spiral cutting action gives a smoother operation during the feeding of the cutter head and rotation of the last block 35. The spiral edge cutter whirling in the path 33 forms the first or roughing cut, indicated at 34, on the last block 35 and the apex cutter 10 effects the finishing action in cooperation exactly similar to the straight edge cutter head of Figs. 1, 2, and 3, as will be readily appreciated.

Preferably, I utilize my present improved and novel form of mushroom cutter head in connection with my improved last lathe, as shown in my copending application, Ser. No. 562,529, filed September 12, 1931.

My novel form of mushroom cutter head is of extremely sturdy construction, very economical to make, presenting cutting edges easily sharpened, and of long-wearing surfaces, with a finishing cutting edge capable of fine work and quick adjustability where an interchangeable finishing cutting ring is used, and gives a range of capacity of wood turning work heretofore considered impossible in devices of this kind.

I claim:

A combined roughing and finishing cutter head for lathes or the like, having a substantially mushroom shape, and comprising an apex and a plurality of wings extending therefrom, a cup-shaped cutter for the apex of the mushroom and a plurality of radially extending cutting edges extending therefrom and on the wings thereof, said cup-shaped cutter having a circumferential cutting edge lying in a plane in which the axis of the cutter head lies, there being provision for cutting clearance both on the apex and said cutting edges.

HAROLD W. SPRAGUE.